United States Patent Office 3,647,869
Patented Mar. 7, 1972

3,647,869
NOVEL PERHYDRATES OF TRI-ALKALI METAL CITRATES
Hans K. Kaloff, Haan, Germany, assignor to Henkel & Cie, GmbH, Dusseldorf, Germany
No Drawing. Filed Apr. 13, 1970, Ser. No. 28,049
Int. Cl. C07c *59/16*
U.S. Cl. 260—535 P   7 Claims

ABSTRACT OF THE DISCLOSURE

Perhydrates of trisodium and tripotassium citrate of the formulas

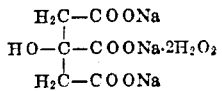

and

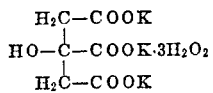

useful as oxygen-releasing bleaching components in various cleansing compositions, such as denture cleansers and laundering compositions, and as color developers in hair coloring compositions, and method of preparing such perhydrates.

---

This invention relates to perhydrates of trisodium or tripotassium citrate, and to a process of preparing these compounds.

BACKGROUND OF THE INVENTION

Besides numerous other compounds, citric acid has been suggested as a stabilizer for hydrogen peroxide, but this use has not found wide practical acceptance. Moreover, it is not possible to form perhydrates from free citric acid and hydrogen peroxide.

OBJECTS OF THE INVENTION

It is an object of the present invention to provide stable alkali metal citrate perhydrates which readily release active oxygen in solution.

Another object of this invention is to provide a simple and economical process for the preparation of stable alkali metal citrate perhydrates from alkali metal citrates and hydrogen peroxide.

Still other objects and advantages of the instant invention will become apparent as the description thereof proceeds.

THE INVENTION

The above objects are achieved by virtue of the fact that I have discovered that it is possible to prepare stable alkali metal citrate perhydrates of the formulas

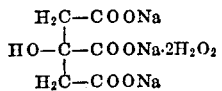   (I)

and

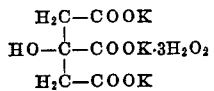   (II)

from the corresponding alkali metal citrate and a concentrated aqueous hydrogen peroxide solution.

More particularly, the perhydrates of the Formulas I and II above are generally prepared in accordance with the present invention by reacting trisodium citrate or tripotassium citrate with an aqueous hydrogen peroxide solution of the feasibly highest possible concentration. The hydrogen peroxide solution should advantageously have an $H_2O_2$ concentration of more than 60% by weight and should be provided in excess of the theoretically required amount; the excess should amount to about 5–20% by weight. Trisodium citrate dihydrate or tripotassium citrate monohydrate, respectively, which are both readily accessible, are preferably used as the citrate starting component.

One particular method of effecting the reaction according to the present invention comprises admixing the reaction components with each other and, while stirring, first carefully evaporating the mixture at a temperatures of 35–60° C. until it reaches a syrupy consistency, and then continuing the evaporation to dryness in a vacuum of 1–100 mm. Hg, preferably below 50 mm. Hg, at a temperature of 10–60° C., especially below 50° C. If desired, the evaporation to dryness in vacuo may be effected in the presence of a drying agent, such as $P_4O_{10}$; if this procedure is used, it is advantageous to admix initially only two-thirds of the required amount of hydrogen peroxide solution with the citrate, and add the remainder just prior to the vacuum drying step.

Another way of effecting the reaction in accordance with the present invention is to charge the reaction components into a kneader or a mechanically equivalent device, agitate the mixture therein until it reaches a syrupy consistency, and thereafter evaporating it to dryness, preferably in vacuo. This procedure is particularly advantageous when a hydrogen peroxide solution of very high concentration is employed.

It is also possible to react the starting materials in a fluid bed; under these conditions it is advisable to start from anhydrous trisodium or tripotassium citrate and virtually 100% hydrogen peroxide.

The reaction in accordance with the present invention may also, if desired, be carried out in the presence of a known peroxide stabilizer, such as a pyridine dicarboxylic acid, acid sodium pyrophosphate, magensium silicate or a 1-hydroxyalkane-1,1-diphosphonic acid, preferably in the form of an alkali metal salt. For this purpose the stabilizer is added in an amount from 0.3 to 6% by weight, preferably 0.5 to 3% by weight, based on the theoretical weight of the alkali metal citrate perhydrate reaction product.

The above-described embodiments of the process according to the present invention yield stable perhydrates of the Formulas I and II above, that is, trisodium citrate with 2 mols of $H_2O_2$ or tripotassium citrate with 3 mols of $H_2O_2$.

The following examples further illustrate the present invention and will enable others skilled in the art to understand it more completely.

EXAMPLE 1

294.12 gm. (1 mol) of trisodium citrate dihydrate were admixed with 74.5 gm. of aqueous 70% hydrogen peroxide (⅔ of 2.3 mols $H_2O_2$) and, while stirring, the reaction mixture was evaporated by very gentle heating until it reached a syrupy consistency. Thereupon 37.3 gm. of aqueous 70% hydrogen peroxide (⅓ of 2.3 mols $H_2O_2$) were added while stirring, and the mixture was evaporated to dryness at 45° C. and in a vacuum of 30 mm. Hg in the presence of $P_4O_{10}$. The dry product was identified to be the diperhydrate of trisodium citrate of the formula

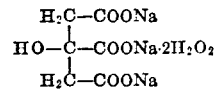

based on the following analytical data.

Calculated (percent): C, 22.0; H, 2.8; Na, 21.2; O (active), 9.8; $H_2O_2$, 20.9. Found (percent): C, 22.0; H, 2.9; Na, 21.0; O (active), 9.9; $H_2O_2$, 21.0.

EXAMPLE 2

324.4 gm. (about 1 mol) of tripotassium citrate monohydrate were admixed, while stirring, with 160 gm. of aqueous 70% hydrogen peroxide (about 3.3 mols of $H_2O_2$) and 2% by weight, based on the theoretical amount of tripotassium citrate triperhydrate end product, of magnesium silicate. The reaction mixture was then evaporated to dryness at 40° C. in a vacuum of 20 mm. Hg and in the presence of $P_4O_{10}$. The dry product was identified to be the triperhydrate of tripotassium citrate of the formula

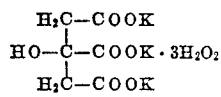

Taking into consideration the $MgSiO_3$-content, the product had an actual $H_2O_2$-content of 25.1% as against a calculated $H_2O_2$-content of 25.0%.

The tri-alkali metal citrate perhydrates according to the present invention, that is, those of the Formulas I and II above, have useful properties. More particularly, they are useful as oxygen-releasing bleaching components in various cleansing compositions, such as denture cleansers and laundering compositions, and as bleaching, color-developing and fixing agents in hair treating compositions.

In comparison to other stable perhydrates, such as urea perhydrate (urea hydrogen peroxide), the perhydrates of the present invention have the advantage that not only the active oxygen-releasing properties of the peroxide moiety but also the sequestering properties of the citrate moiety can be utilized. This advantage makes the compounds of the instant invention particularly suitable for incorporation into cosmetic preparations, such as denture cleansers, hair bleaching compositions, hair coloring compositions and cold-waving compositions.

Although the perhydrates of the instant invention are adequately stable as such, their stability may, if desired, be improved by addition of known perhydrate stabilizers. As indicated above, these stabilizers may be added during the preparation of the perhydrates or also subsequent to their preparation.

If the perhydrates of the present invention are to be subjected to relatively long storage periods, their shelf-life may be prolonged by encasing them by known physical or chemical procedures in an envelope which is air-impermeable but soluble in alkaline detergent solutions, made of such materials as fatty acids, waxes, paraffins, polyvinyl alcohols, cellulose esters, cellulose ethers or the like. The thus encased perhydrates may then be incorporated into laundering and cleaning compositions, wherein they act simultaneously as complex-forming sequestering agents as well as active oxygen-releasing agents.

The following examples illustrate various cosmetic and cleaning compositions comprising a perhydrate of the present invention as an ingredient, and represent the best mode contemplated of putting the invention to practical use. The parts and percenages in these examples are by weight unless otherwise specified.

EXAMPLE 3

Denture cleanser

A sufficient amount of the diperhydrate of trisodium citrate was compressed into tablets. The tablets were readily soluble in water and had a very good cleaning effect upon dentures soaked in the aqueous solution.

EXAMPLE 4

Hair bleaching cream

A homogeneous mixture was prepared from the following ingredients:

| | Parts |
|---|---|
| Fatty alcohol (carbon chain length $C_{16}$–$C_{18}$) | 20 |
| Fatty alcohol sulfate (coconut oil base) | 3 |
| Decyl oleate | 5 |
| Emulsifier (adduct of 40 mols ethylene oxide and 1 mol castor oil) | 6 |
| Ammonium sulfate | 2 |
| Perfume | 0.5 |

The mixture was adjusted to a pH of 9.5–10 with ammonia, and a sufficient amount of water was added to make a total of 100 parts, and the aqueous mixture was blended into a cream.

Just prior to use, 50 gm. of the cream were uniformly admixed with 21 gm. of a mixture consisting of

| | Percent |
|---|---|
| Trisodium citrate diperhydrate | 95 |
| Disodium salt of 1-hydroxyethane-1,1-diphosphonic acid | 4.5 |
| Colloidal silicic acid | 0.5 |

When the resulting bleaching cream was applied to dark-blond human hair, allowed to remain in contact therewith for 30 minutes at room temperature and then washed out, a strong bleaching effect was obtained without impairing the natural sheen and feel of the hair.

The same results were obtained when an equivalent amount of tripotassium triperhydrate was substituted for the trisodium diperhydrate in the above composition.

EXAMPLE 5

Hair coloring cream

The following ingredients were uniformly admixed:

| | Parts |
|---|---|
| Fatty alcohol (carbon chain length $C_{16}$–$C_{18}$) | 10 |
| Fatty alcohol sulfate (coconut oil base) | 10 |
| p-Toluylene diamine | 1 |
| m-Toluylene diamine | 0.1 |
| Resorcinol | 0.5 |
| Ammonium sulfate | 0.5 |

The resulting mixture was adjusted to a pH of 9.5–10 with ammonia, enough water was added to make 100 parts, and the aqueous mixture was blended into a cream.

50 gm. of the cream thus obtained were admixed with 9 gm. of a mixture consisting of

| | Parts |
|---|---|
| Trisodium citrate diperhydrate | 96 |
| Disodium salt of 1-hydroxyethane-1,1-diphosphoric acid | 4 |

The resulting mixture was applied to medium blond human hair, allowed to remain in contact therewith for 30 minutes at room temperature, and then washed out. The hair was colored uniformly deep black.

The same result was obtained when the trisodium citrate diperhydrate in the above composition was replaced by an equivalent amount of tripotassium citrate triperhydrate.

EXAMPLE 6

Cold-wave fixer

Human hair, rolled on thin curling rollers, was treated for 15 minutes at room temperature with an aqueous 6% thioglycolic acid solution which had been adjusted to a pH of 9.2 with monoethanol amine. Thereafter, the rolled-up treated hair was rinsed with water and then treated with a wave-fixing solution prepared by dissolving 6 gm. of trisodium citrate diperhydrate in 50 ml. of water and adjusting the solution to a pH of 4–6 with citric acid.

A durable waving effect was obtained after drying and removal of the curlers.

EXAMPLE 7

Laundering composition

A granular detergent preparation having the following composition

| | Percent |
|---|---|
| Sodium n-dodecylbenzene sulfonate | 10 |
| Nonylphenol polyglycol ether (8 ethyleneglycol ether groups) | 3 |
| Sodium soap from saturated $C_{12}$–$C_{22}$ fatty acid | 3 |
| Pentasodium triphosphate | 40 |
| Tetrasodium pyrophosphate | 5 |
| Sodium silicate ($Na_2O$:$SiO_2$=1:3.3) | 5 |
| Magnesium silicate | 2 |
| Sodium cellulose glycolate | 1.5 |
| Optical brighteners and perfume | 0.5 |
| Water | 7 |
| Trisodium citrate diperhydrate (enveloped in palmitic acid) | 23 | was manufactured.

The detergent composition including all of the above ingredients except the diperhydrate was manufactured by the conventional spray-drying process in a spray tower, and the diperhydrate was subsequently uniformly distributed therein.

The palmitic acid-coated granules of diperhydrate were prepared in conventional fashion by treating trisodium citrate diperhydrate with a 7% solution of palmitic acid in carbon tetrachloride and spray-drying the mixture. The coating constituted about 20% by weight of the coated granules.

A laundering detergent with very good washing and bleaching properties was obtained.

The same results were obtained when tripotassium citrate triperhydrate was substituted for trisodium citrate diperhydrate in the above composition.

While the present invention has been illustrated with the aid of certain specific embodiments thereof, it will be readily apparent to others skilled in the art that the invention is not limited to the illustrative embodiments and that various changes and modifications may be made without departing from the spirit of the invention or the scope of the appended claims.

I claim:

1. An alkali metal citrate perhydrate of the formula

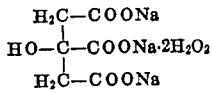

or

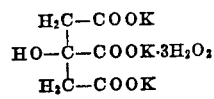

2. An alkali metal citrate perhydrate according to claim 1, which is trisodium citrate diperhydrate.

3. An alkali metal citrate perhydrate according to claim 1, which is tripotassium citrate triperhydrate.

4. The method of preparing an alkali metal citrate perhydrate of the formula

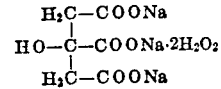

or

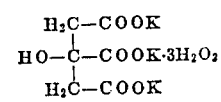

which comprises admixing trisodium citrate or tripotassium citrate with a stoichiometric excess of aqueous at least 60% hydrogen peroxide, and evaporating the mixture to dryness.

5. The method of preparing trisodium citrate diperhydrate according to claim 4, wherein a hydrate of trisodium citrate is admixed with aqueous at least 60% hydrogen peroxide in a molar citrate:peroxide ratio of 1:2–2.4, and the mixture is evaporated to dryness in vacuo.

6. The method of preparing tripotassium citrate triperhydrate according to claim 4, wherein a hydrate of tripotassium citrate is admixed with aqueous at least 60% hydrogen peroxide in a molar citrate:peroxide ratio of 1:3–3.6, and the mixture is evaporated to dryness in vacuo.

7. The method of preparing trisodium citrate diperhydrate according to claim 5, wherein the dihydrate of trisodium citrate is admixed with about two-thirds of the required amount of aqueous hydrogen peroxide, the mixture is stirred to syrupy consistency, the remaining amount of aqueous hydrogen peroxide is added, and the mixture is evaporated to dryness in vacuo at a moderately elevated temperature and in the presence of $P_4O_{10}$.

References Cited

FOREIGN PATENTS 905,817  2/1960  Great Britain _____ 260—535

LORRAINE A. WEINBERGER, Primary Examiner

P. KILLOS, Assistant Examiner

U.S. Cl. X.R.

252—99; 424—53, 62 Digest 3, 70, 71